United States Patent Office 2,850,527
Patented Sept. 2, 1958

2,850,527

PROCESS FOR THE PRODUCTION OF AROMATIC DICARBOXYLIC ACIDS

Josef Binapfl, Krefeld, Germany, assignor to Farbenfabriken Bayer Aktiengesellschaft, Leverkusen, Germany, a corporation of Germany No Drawing. Application March 31, 1953
Serial No. 346,023

Claims priority, application Germany March 31, 1952

14 Claims. (Cl. 260—524)

It is known to transform aromatic hydrocarbons with aliphatic side chains, especially toluene and xylene, into the corresponding carboxylic acids, by the action of oxygen-containing gases. The oxidation of such hydrocarbons succeeds even under mild conditions. Thus one can for example product benzoic acid by passing air through toluene, or phthalic acid or iso- or terephthalic acid by passing air through o-, m- or p-xylene respectively, at temperatures below about 200° C. These reactions can be accelerated by the use of pressure and the addition of catalysts. It has already been proposed to react the hydrocarbons in organic solutions or in aqueous solutions or suspensions of bases or acid-binding salts or mixtures thereof, in which case catalysts may suitably be added. The dilution of the hydrocarbons has however the consequence that one must employ very energetic conditions, working for instance at 250° under a pressure of 60 atmospheres. The reaction does not then, however, lead simply to the corresponding carboxylic acids. Besides the acids there are also produced alcohols and aldehydes. The oxidation of a second alkyl group of the benzene nucleus is rendered especially difficult, so that for example when using p-xylene, only a little terephthalic acid results, in comparison with considerable quantities of p-toluic acid, as well as aldehyde and unused xylene.

It is further known that the corresponding carboxylic acids may be obtined by heating halogen alkylated benzenes in the presence of aqueous alkalies, where by splitting-off of the halogen of the alkyl residue produces first the corresponding alcohol and by dehydrogenation of the latter, the carboxylic acid. The presence of oxygen in this reaction can lead in certain cases to the combination of the hydrogen evolved, to form water. If in this process besides a halogen-alkyl residue, there are available other alkyl residues, at the benzene nucleus, e. g., a methyl group, these are not affected. Thus there is produced for example from p-xylyl chloride by heating with caustic soda under pressure even in the presence of oxygen, not terephthalic acid but p-toluic acid or its salts.

It has now been surprisingly found that one can produce aromatic dicarboxylic acids in good yields, by heating halogeno-methyl-alkyl benzene in aqueous suspensions in the presence of bases and of oxygen or oxygen-containing gases, and preferably under high pressure, if one carries out the reaction in the presence of oxidation catalysts.

According to this process not only the halogeno-alkyl-group but, in contrast to the oxidation of dialkyl-benzenes with oxygen and the reaction of halogen alkyl-alkyl-benzenes with caustic alkalies in the presence of oxygen, also the alkyl groups are to a considerable degree transformed into carboxyl groups. The aforesaid process thus represents an important route for obtaining technically valuable phthalic acids, as the halogeno-methyl-alkyl benzenes preferably serving as starting materials are easily obtained for instance by the action of formaldehyde and hydrochloric acid on toluene.

Among the halogeno-methyl-alkyl benzenes which according to the foregoing process can with advantage most suitably be oxidised to the corresponding dicarboxylic acids are preferably: 1-chloromethyl-4-methyl benzene and 1-chloromethyl-2-methyl benzene; further for instance 1-chloromethyl-3-methyl benzene, 1-bromomethyl-4-methyl benzene, 1-bromomethyl-2-methyl benzene, 1-bromomethyl-3-methyl benzene, 1-chloromethyl-4-ethyl benzene, 1-chloromethyl-3-ethyl benzene, 1-chloromethyl-4-n-propyl benzene, 1-chloromethyl-2-n-propyl benzene, 1-chloromethyl-3-n-propyl benzene, 1-chloromethyl-4-isopropyl benzene, 1-chloromethyl-2-isopropyl benzene, 1-chloromethyl-3-isopropyl benzene, 1-bromomethyl-4-isopropyl benzene, 1-chloromethyl-4-amyl benzene, 1-chloromethyl-2-amyl benzene and 1-chloromethyl-3-amyl benzene. In certain cases one can use mixtures of these materials, for example a mixture of 1-chloromethyl-4-methyl benzene and 1-chloromethyl-2-methyl benzene, and then separate from one another the resulting phthalic and terephthalic acids.

Suitable oxydation-catalysts for the foregoing process are for instance oxides and/or heavy metal salts such as those of silver, cobalt, copper and manganese, or lead oxide or peroxide, or naphthenates or stearates of cobalt or manganese, or mixtures of such materials.

The process is advantageously so carried out that one brings the halogeno-methl-alkyl benzene and the catalyst into an aqueous caustic alkali such as sodium, potassium or calcium hydroxide solution, and introduces oxygen or air with thorough mixing. The reaction can be accelerated by employing elevated temperatures and if necessary pressure. The temperature during the reaction may vary according to the conditions. Good results were obtained with temperatures above 100° C., the upper limit being given only by the decomposition temperatures of the reaction components and by the resistivity of the construction material. In general especially good results were obtained with temperatures ranging from about 150° to about 250° C.

To achieve high reaction velocities it is advantageous to work under elevated pressure. It can also be arranged that oxygen or air is compressed into the mixture in a stirring- or shaking-autoclave. Suitable pressures lie for instance between about 20 and about 250 atm. and especially between 170–250 atm. The carrying out of the process on a technical scale can also take a continuous form when one allows the reaction mixture to run through a pressure vessel into which oxygen or air is compressed.

The concentration of the alkali to be used can lie between wide limits, for example between about 1% and about 50% and especially between about 20 to about 33%. To achieve good yields it is advantageous to use at least such a quantity of basic material that all the acids released by the reaction i. e., the hydrogen halide and the organic acids, will be neutralized. Since besides the aromatic dicarboxylic acids there are also produced small quantities of other acid oxidation products such as oxalic acid or carbonic acid, it is recommended to use an excess of basic materials over the amount calculated for the production of hydrogen halide and aromatic dicarboxylic acids, so that the reaction mixture is in every case still alkaline at the end of the reaction.

The necessary reaction conditions appropriate to an individual case can easily be determined by simple experiment.

The following examples are given for the purpose of illustrating the invention.

Example 1

141 g. (1 mol) of 1-chloromethyl-4-methyl benzene are treated with air in the presence of 900 g. of 29% caustic soda solution, 1.5 g. lead oxide and 1.5 g. lead peroxide in an autoclave of acid resistant steel, with stirring, at 250° C. and at a pressure of 170 to 250 atm. In the mass, as the oxygen content in the reaction vessel falls (end-content of oxygen in the exhaust gas 2%-3%) the residual gas is allowed to escape and the pressure vessel is newly filled with fresh compressed air. After about 7 hours the oxygen content becomes gradually stationary. After acidifying the reaction product with dilute sulphuric acid one obtains a white deposit which consists of halogen-free terephthalic acid still containing about 6%-7% p-toluic acid. The yield of pure terephthalic acid amounts to 123 g. (=74% of theory).

Example 2

A mixture of 77 g. (½ mol) of 1-chloromethyl-4-ethyl benzene, produced by the known process by the reaction of formaldehyde on ethyl benzene in the presence of hydrochloric acid, 850 g. of 20% caustic soda solution, 3 g. of lead oxide and 2 g. of lead peroxide is treated by air at 265–270° C. at a pressure of about 90 atm. in an autoclave of acid resistant steel. In the mass, as the oxygen content in the reaction vessel falls (end content of oxygen in the exhaust gas about 3%-4%) the residual gas is allowed to escape and the pressure vessel is newly filled with fresh compressed air. After about 12 hours the oxygen content becomes gradually stationary. The reaction mass is then treated with steam for about 4 hours. A small quantity (about 2 g.) of an oily distillate is separated in this manner. In the vessel remain a clear alkaline solution and about 11 g. of a resinous residue. The solution is separated and acidified with dilute sulphuric acid. One obtains 37 g. of terephthalic acid (=44% of theory).

Example 3

A mixture of 76 parts by weight of 1-chloromethyl-4-methyl benzene and 65 parts by weight of 1-chloromethyl-2-methyl benzene, such as is produced by known processes by the reaction of formaldehyde on toluene in the presence of hydrochloric acid, is treated with air under the conditions specified in Example 1, in the presence of 950 parts by weight of 28% caustic soda solution. By acidification of the grey, mealy reaction product with dilute sulphuric acid one obtains a white deposit, which after filtering and repeated washing with water consists of 59 parts by weight of terephthalic acid. From the filtrate and the washing water 48 parts by weight of phthalic acid can be recovered by extraction with ether. As a side-product a small quantity of p-toluic acid is produced.

I claim:

1. A process for the production of aromatic dicarboxylic acids which comprises heating an aqueous suspension of a mono-halogenomethyl mono-lower alkyl benzene, said lower alkyl substituent containing at least one hydrogen substituent on the benzene-moiety-linking carbon atom and the halogeno substituent being selected from the group consisting of chlorine and bromine, in the presence of a caustic base and oxygen and a heavy metal containing oxidation catalyst, wherein the heavy metal is selected from the group consisting of silver, cobalt, copper, manganese and lead, at temperatures ranging from about 100° C. to about 270° C.

2. The process of claim 1 wherein elevated pressure conditions are employed.

3. The process of claim 1 wherein air is the source of oxygen.

4. A process for the production of phthalic acid which comprises heating at temperatures from about 265 to about 270° C. a 1-halogenomethyl-2-lower alkyl benzene, said lower alkyl substituent containing at least one hydrogen substituent on the benzene-moiety-linking carbon atom, in aqueous suspension in the presence of a caustic base and air and a heavy metal containing oxidation catalyst, wherein the heavy metal is selected from the group consisting of silver, cobalt, copper, manganese and lead, under elevated pressure, the 1-halogeno substituent being selected from the group consisting of chlorine and bromine.

5. A process for the production of phthalic acid which comprises heating at temperatures from about 150 to about 250° C. a 1-halogenomethyl-2-methyl benzene in aqueous suspension in the presence of a caustic base and air and a heavy metal containing oxidation catalyst, wherein the heavy metal is selected from the group consisting of silver, cobalt, copper, manganese and lead, under elevated pressure, the 1-halogeno substituent being selected from the group consisting of chlorine and bromine.

6. A process for the production of terephthalic acid which comprises heating under elevated pressure at temperatures from about 150° C. to about 270° C. an aqueous suspension of a 1-halogenomethyl-4-lower alkyl benzene, said lower alkyl substituent containing at least one hydrogen substituent on the benzene-moiety-linking carbon atom and the halogeno substituent being selected from the group consisting of chlorine and bromine, in the presence of a caustic base and oxygen and a heavy metal containing oxidation catalyst, wherein the heavy metal is selected from the group consisting of silver, cobalt, copper, manganese and lead.

7. The process of claim 6 wherein the 4-lower alkyl substituent is methyl.

8. The process of claim 6 wherein the 1-halogenomethyl-4-lower alkyl benzene is 1-chloromethyl-4-methyl benzene.

9. A process for the production of terephthalic acid which comprises heating at temperatures from about 265 to about 270° C. an 1-halogenomethyl-4-ethyl benzene in aqueous suspension in the presence of a caustic base and air and a heavy metal containing oxidation catalyst, wherein the heavy metal is selected from the group consisting of silver, cobalt, copper, manganese and lead, under elevated pressure, the 1-halogeno substituent being selected from the group consisting of chlorine and bromine.

10. A process for the production of terephthalic acid which comprises heating at temperatures from about 265 to about 270° C. 1-chloromethyl-4-ethyl benzene in aqueous suspension in the presence of a caustic base and air and a heavy metal containing oxidation catalyst, wherein the heavy metal is selected from the group consisting of silver, cobalt, copper, manganese and lead, under elevated pressure.

11. A process for the production of phthalic acid which comprises heating at temperatures from about 150 to about 250° C. 1-chloromethyl-2-methyl benzene in aqueous suspension in the presence of a caustic base and air and a heavy metal containing oxidation catalyst, wherein the heavy metal is selected from the group consisting of silver, cobalt, copper, manganese and lead, under elevated pressure.

12. A process for the production of terephthalic acid which comprises heating at a temperature of about 250° C., 1-chloro-methyl-4-methyl benzene in an aqueous suspension in the presence of caustic soda and air and lead oxide and lead peroxide under about 170–250 atm. during about 7 hours, acidifying the reaction mixture and separating the terephthalic acid.

13. A process for the production of terephthalic acid which comprises heating at temperatures from about 265 to 270° C. 1-chloromethyl-4-ethyl benzene in aqueous suspension in the presence of caustic soda and air and lead oxide and lead peroxide and a pressure of about 90 atm. during 12 hours, treating the reaction mass with steam during about 4 hours, separating the clear solution, acidifying it and separating the terephthalic acid.

14. A process for the production of material selected from the group consisting of the phthalic acid and the terephthalic acid which comprises heating at a temperature of about 250° C. a mixture of 1-chloromethyl-4-methyl benzene and 1-chloromethyl-2-methyl benzene in aqueous suspension in the presence of caustic soda and air and lead oxide and lead peroxide under a pressure of about 170–250 atm. during about 7 hours, acidifying the reaction mixture and separating the terephthalic acid and the phthalic acid.

References Cited in the file of this patent

UNITED STATES PATENTS

| | | |
|---|---|---|
| 2,245,528 | Loder | June 10, 1941 |
| 2,276,774 | Henke et al. | Mar. 17, 1942 |
| 2,479,067 | Gresham | Aug. 16, 1949 |
| 2,563,820 | Darragh et al. | Aug. 14, 1951 |

FOREIGN PATENTS

| | | |
|---|---|---|
| 63,987 | Netherlands | Aug. 15, 1949 |
| 494,439 | Belgium | Mar. 31, 1950 |
| 623,836 | Great Britain | May 24, 1949 |
| 644,707 | Great Britain | Oct. 18, 1950 |